(12) United States Patent
Schenk et al.

(10) Patent No.: US 11,104,046 B2
(45) Date of Patent: Aug. 31, 2021

(54) OVERMOLDED BODY FOR BAR FEEDER

(71) Applicant: LNS Management SA, Orvin (CH)

(72) Inventors: Mark Schenk, Taipei (TW); Frank Reisser, Biel/Bienne (CH)

(73) Assignee: LNS MANAGEMENT SA, Orvin (CH)

( * ) Notice: Subject to any disclaimer, the term of this patent is extended or adjusted under 35 U.S.C. 154(b) by 592 days.

(21) Appl. No.: 15/819,851

(22) Filed: Nov. 21, 2017

(65) Prior Publication Data

US 2018/0147759 A1 May 31, 2018

(30) Foreign Application Priority Data

Nov. 30, 2016 (EP) .................................. 16201424

(51) Int. Cl.
| | | |
|---|---|---|
| B32B 13/02 | (2006.01) | |
| B29C 45/14 | (2006.01) | |
| B23B 13/02 | (2006.01) | |
| B29C 39/02 | (2006.01) | |
| B23B 5/08 | (2006.01) | |
| B23B 13/12 | (2006.01) | |
| B23Q 7/04 | (2006.01) | |
| B29K 103/08 | (2006.01) | |

(52) U.S. Cl.
CPC .......... *B29C 45/14065* (2013.01); *B23B 5/08* (2013.01); *B23B 13/02* (2013.01); *B23B 13/123* (2013.01); *B29C 39/021* (2013.01); *B23Q 7/042* (2013.01); *B29K 2103/08* (2013.01)

(58) Field of Classification Search
CPC ....... B28B 7/0029; B28B 7/0064; B28B 7/20; B28B 7/0079; B23B 13/02; B23B 13/126; B23B 13/128
See application file for complete search history.

(56) References Cited

U.S. PATENT DOCUMENTS

| | | | | |
|---|---|---|---|---|
| 1,052,149 | A | * 2/1913 | Kennedy | ............... E04B 1/4121 |
| | | | | 52/701 |
| 1,645,776 | A | * 10/1927 | Sanson | ................. B28B 7/0044 |
| | | | | 249/104 |
| 3,800,636 | A |   4/1974 | Zagar | |
| 4,427,818 | A | * 1/1984 | Prusinski | ............ B29B 17/0042 |
| | | | | 264/911 |

(Continued)

FOREIGN PATENT DOCUMENTS

| | | |
|---|---|---|
| DE | 133201 A1 | 12/1978 |
| DE | 10251228 C1 | 11/2003 |

(Continued)

OTHER PUBLICATIONS

European Search Report issued in corresponding European application No. 16201424 dated May 15, 2017, 12 pages (with English language translation).

*Primary Examiner* — Matthew J Daniels
(74) *Attorney, Agent, or Firm* — Pearne & Gordon LLP (57) ABSTRACT

Method of producing a body (1) for bar feeders, wherein it comprises a first molding step (A) carried out with the aid of a first molding material (M1) in a mold (20) jointly with an overmolding step (B) of a countermold (50), the shape of the mold (20) and/or the shape impressions of the countermold being conceived to achieve in an integral way at least one structural and/or functional element of the said bar feeder.

14 Claims, 7 Drawing Sheets

(56) References Cited

U.S. PATENT DOCUMENTS

| | | | |
|---|---|---|---|
| 4,604,924 A * | 8/1986 | Cucchi | B23B 13/12 82/126 |
| 5,195,408 A * | 3/1993 | Niehaus | B23B 13/02 29/37 R |
| 2004/0104332 A1 * | 6/2004 | Rampf | B28B 1/081 249/125 |

FOREIGN PATENT DOCUMENTS

| | | |
|---|---|---|
| EP | 0070073 A1 | 1/1983 |
| EP | 1683602 | 7/2006 |
| JP | S-4941377 U | 4/1974 |
| JP | 3208314 B2 | 9/2001 |

* cited by examiner

OVERMOLDED BODY FOR BAR FEEDER

TECHNICAL FIELD OF THE INVENTION

This invention relates to the field of bar feeders. More specifically, it concerns a method of producing a body, preferably made using polymer concrete, as well as a body obtained by such a production method for bar feeders.

STATE OF THE ART

The use of polymer concrete is known for machine tools as the filling material of hollow structures, permitting notably to increase the mass and to reinforce the rigidity, and also to damp the vibrations better during their use. The patent document EP1683602 describes such an example of a machine tool whose framework is partially filled with polymer concrete. No structural element nor even less so functional element, is made however using the polymer concrete whose purpose is merely to ballast and make rigid pre-existing structures.

In the more specific context of bar feeders, intended, for example, to route bars to be machines by automatic lathes positioned downstream from the chain of production, the bodies are generally formed by a box in metal, in which is mounted a guide channel for the bars as well as all the control elements for displacing the latter. In certain cases, a central beam is intended to constitute the assembly back bone. In fact, fixed around this central beam is a section in aluminum, in which are arranged the different segments of the guide channel, which are commonly referred to as being bearings, as well as the transmission element or pusher. Different anchorage elements are disposed moreover between the different segments to permit a fine adjustment of the guiding from end to end. Arranged coming out of the bar feeder is a front rest, which constitutes the last guiding element closer to the entry of the lathe spindle. All the electronic components of command and control, relatively voluminous, as well as the transmission and the hydraulic circuit are arranged in the available space in the box, and all the cabling is then disposed between the section in aluminum and the central beam.

One drawback of this assembly system is the dimensional drift during the assembly of each segment, one after the other, which is detrimental for the overall precision of the guiding provided for the bars. On the other hand, assembly of the body turns out to be particularly tedious since for each machine it is necessary to assemble the guide channel segments one by one, which causes relatively high assembly times. Furthermore, apart from high labor costs, the costs of production are likewise quite high because the machining of the section used for the guiding and the beam of metal turn out to be expensive. Finally, owing to the relatively low weight of the frame of the machine, the noises and the vibrations due to the rotation of the bar remain high and relatively irritating for those who need to work in the proximity of such a machine for prolonged periods of time.

There consequently exists a need for a solution free from these known limitations.

SUMMARY OF INVENTION

One object of the present invention is to propose a more efficient solution for production of a body for a bar feeder as well as for a body obtained by such a method in which the costs for production and labor are reduced.

According to the invention, these objects are attained thanks to a method of producing a body for a bar feeder according to claim 1, wherein it comprises a first molding step carried out with the aid of a first molding material in a mold jointly with an overmolding step by a countermold, the shape of the mold and the shape impressions of the countermold being conceived to achieve in an integral way at least one structural and/or functional element of the said body.

These objects are likewise achieved according to the invention thanks to a body obtained by such a production method, characterized in that it comprises at least one first structural and/or functional element achieved in an integral way in a first molding material.

One advantage of the proposed solution is that it achieves savings with respect to economy of scale as well as in terms of intrinsic production costs and in terms of labor.

Another advantage of the proposed solution is that it makes possible better guide features as well as better precision of assembly into bar feeder products, and this with a more homogeneous quality. In fact, the use of reusable molds and countermolds during the manufacture of each new bar feeder makes it possible to solve the problem of dimensional drift by ensuring the identical reproducibility of each new bar feeder, while improving their anti-vibration and anti-noise characteristics, and all of this without increasing their footprint.

According to a preferred embodiment, the proposed production method for a bar feeder body comprises a combined operation of molding and overmolding making it possible to achieve in an integral way a central assembly element constituting the said first structural and/or functional element because the latter replaces at the same time the usual beam and section in aluminum. Moreover, according to one preferred embodiment, the countermold constitutes just a frame to which other types of functional and/or structural elements can be grafted then detached, which are referred to as the "second" elements because they are made up of added mechanical pieces, such as, for example, anchoring elements as well as the structural frame element of the body or opening and closing rings of bearings as functional elements. In this case it is particularly easy to integrate these structural and/or functional elements achieved, for example, in metal in a way other than through fixation or through clamping or even by soldering or welding, but instead by a simple operation of overmolding such as claimed.

According to a particularly advantageous method of production, the first structural and/or functional element obtained following the operation of molding and that of overmolding consists in an integral central core assembly, and the latter forms not just a structural base for the body, in the form of an integral frame, but also a constituent functional piece thereof which can be designated as "pre-functional block". In fact the latter already contains forms resulting from the molding and/or from the overmolding just requiring, for example, the addition of service parts to be fully functional—such as, for example, an integrated guide channel, to which must be simply added bearings of variable size according to the needs as well as a groove to accommodate the opening and closing hinge of the bearings—while other added mechanical pieces held in the mass following the operation of overmolding—such as, for example, the anchoring elements and the opening and closing rings—are already finalized and immediately operational after this combined operation of molding and overmolding. Once this integral central core assembly is achieved, the latter can then be preferably embedded in a box of the body of the bar feeder during a subsequent supplementary operation of molding, thus making it possible to increase still further the mass and the rigidity of the body, but without being conditioned by the production of a structural or functional element requiring an increased precision, notably to ensure the guiding of bars from end to end and the intrinsic alignment of all the constituent parts of the body. The dissociation of the operations of production of functional and/or structural elements during the operation of formation of the integral central core assembly thereof from subsequent filling of the box by the molding material with a view to maximize the mass and to thereby fix permanently this functional and/or structural element produced thus permits gaining efficiency because it is relatively complex to achieve these two operations jointly directly in the box through one single operation of molding and overmolding.

According to a preferred embodiment, the material used for the operation or operations of molding is preferably made up of concrete or polymer resin, the costs of which are relatively low and which have at the same time good properties of density and consequently make it possible to significantly improve the conferred anti-vibration and anti-noise properties while producing the desired structural and/or functional elements.

BRIEF DESCRIPTION OF DRAWINGS

Other advantageous features will emerge more clearly from the description which follows of a particular embodiment of the invention, given by way of non-limiting example, and represented by the attached drawings, in which.

DETAILED DESCRIPTION

Figure 1A:
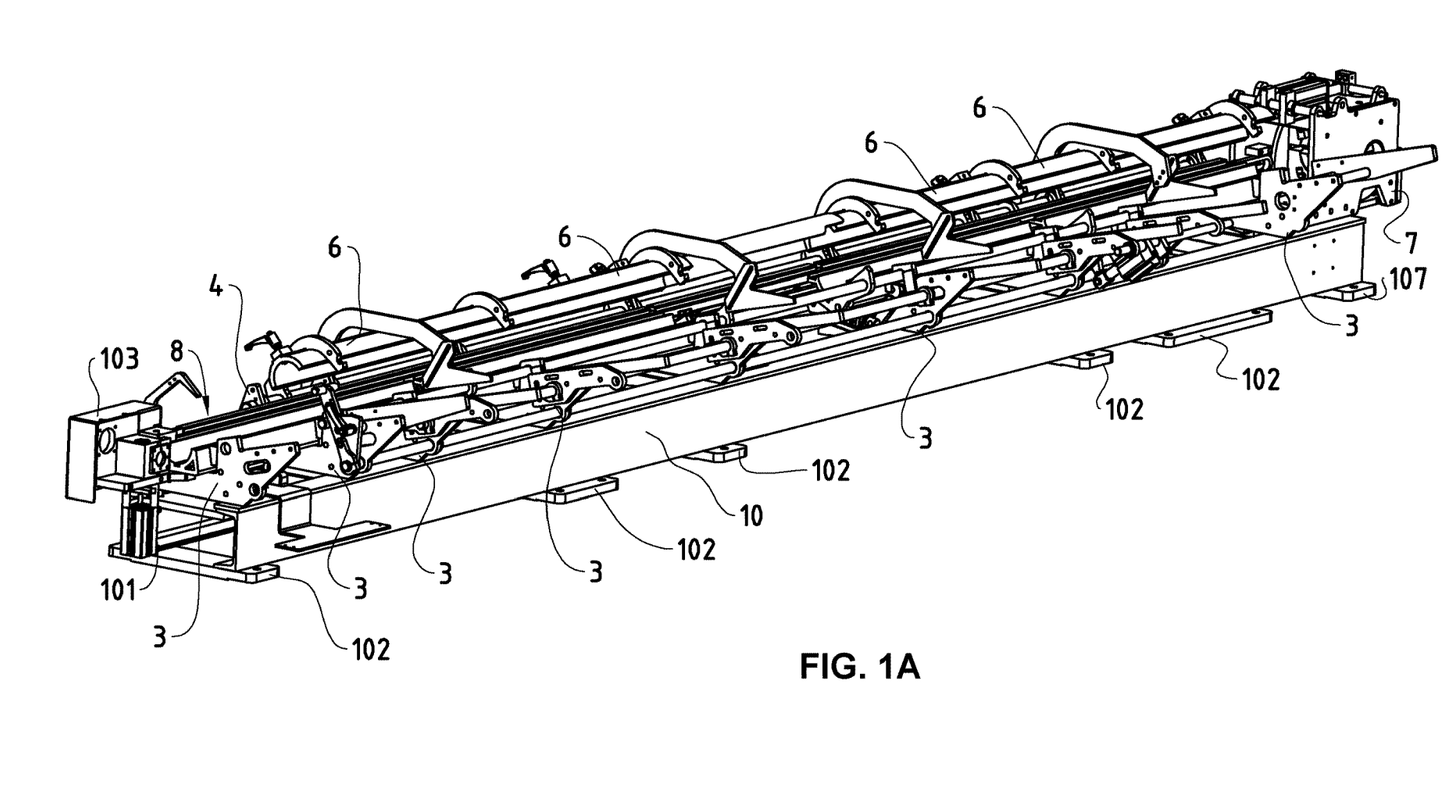
FIGS. 1A and 1B are three-dimensional schematic views of a bar feeder according to the prior art, with their different functional elements, and the bearings in open position and in closed position, respectively.
Figure 1B:
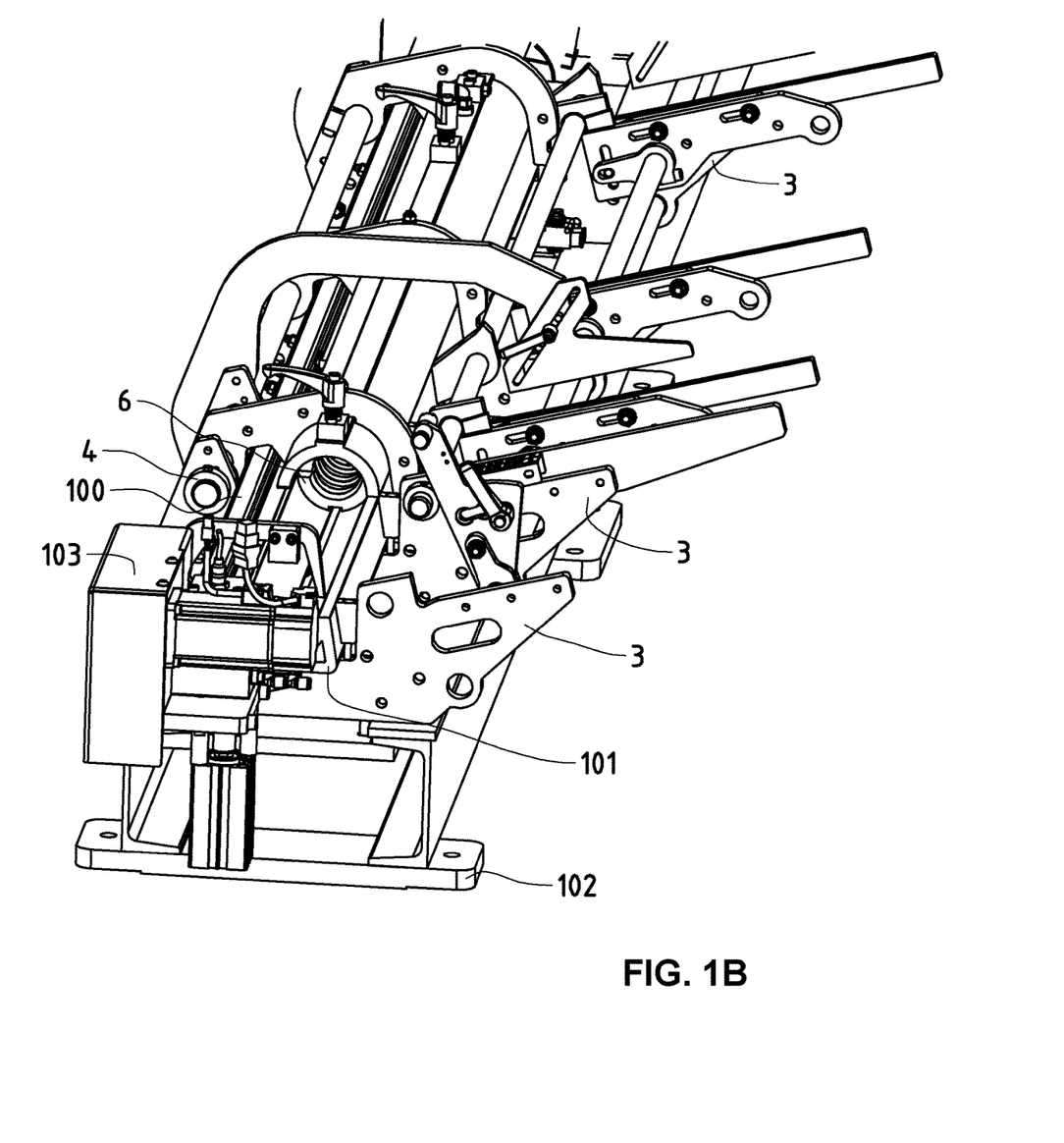

FIGS. 1A and 1B illustrate two schematic views in three dimensions of a bar feeder according to the prior art, mounted on a body constituted by a box 10 of metal, at the base of which are arranged fixation clamps 102 provided for assembly of the feet placed on the floor. The bar feeder is represented in two different functional positions, i.e. a first position (FIG. 1A) in which the bearings 6 are in open position, then a second position (FIG. 1B) in which the bearings 6 are closed. The structure of the body of this bar feeder is structured around a central beam of metal 100, visible in FIG. 1B, which is commonly referred to as "beam", and to which are fixed different anchoring elements 3 and on which are mounted different segments of a section in aluminum 101 inside which are mounted the elements for guiding of the formed bars by the bearings 6. According to the disclosure illustrated in this figure, these bearings 6 are in fact constituted by two shells of identical shape, here semi-cylindrical, articulated around a hinge, to optimize the guiding by restricting it to a single degree of freedom in translation. On each of the two FIGS. 1A and 1B, one can distinguish the opening and closing rings 4 relative to this hinge behind the section in aluminum 101, as well as transmission elements, notably the pusher 8, controlled by an electronic module 103 situated on the entry side of the bar feeder. On the opposite side, on the exit side in FIG. 1A, is situated the front rest 7, which is the last element for guiding for the bars.

The present invention aims to employ a reverse assembly approach to produce more easily the different functional and/or structural elements of such a machine tool. In fact, instead of employing a method of the "bottom-up" type, where a dimensional drift is possible owing to the successive mounting of the different pieces for assembly, one to the others, used here is an approach of the "top-down", aiming to achieve a body in reproductive fashion and while achieving economy of scale and making it possible to gain in precision notably for the functional elements with the aid of operations of molding and of overmolding, where not just the mold but also the countermold are reusable. Within the context of the present invention, understood by structural element for the body is an element in which the effective geometric form is produced without it necessarily fulfilling a particular function for the bar feeder, while understood by functional element is an element whose form is intrinsically linked to a function for the bar feeder from a mechanical point of view, such as, for example, a function of guiding for the bearings 6. Certain pieces however can be considered as being at the same time structural and functional, such as, for example, the anchoring pieces 3, because the latter confer at the same time a shape to the frame or skeleton of the body 1 while achieving in parallel a function of support for the bar feeder. The functional or structural elements can be molded and their shape is conditioned, at least partially, by the shape of the mold 20 or of the countermold 50 (as, for example, the slides or grooves corresponding to the central guide channel 2A intended to receive the bearings 6, or moreover the closure hinge 2B of the half-shells of the bearings 6 achieved, for example, by concave forms of the mold 20): such elements are designated as "first" functional and/or structural elements. When they consist of added and overmolded mechanical pieces, such as the anchoring pieces 3 or the rings 4 for opening and closing of the bearings, these elements are designated as "second" functional and/or structural elements. All these elements are visible in the following FIGS. 2 and 5 corresponding to a preferred embodiment of the invention.

According to this preferred embodiment for the present invention, one seeks to replace the "beam" as well as the aluminum section, that is to say the two central elements of a conventional bar feeder (reference numerals 100 and 101 of the preceding FIGS. 1A and 1B), by an integral central core assembly 2 combining these two usual reinforcement elements which one then positions in the box of the body 1 to be produced. Such an integral central core assembly 2 is illustrated furthermore in FIGS. 4C and 4D in particular. As can be noted in FIG. 2, the countermold 50 preferably contains a frame to which are fixed part of the removable elements, that is to say second pieces of structural and/or functional elements consisting of added mechanical pieces, and which are intended to be removed from the countermold 50 after the overmolding. This is the case here notably with the anchoring pieces 3 as well as the opening and closing rings 4 of the bearings 6, which one finds again in FIG. 5 when the body 1 is finished. In other words, these functional elements (that is to say the anchoring pieces 3 and the rings 4) remain embedded in the mass of the molding material to form a resultant massive, extremely rigid structure, in which the anti-vibrations specifications are thus improved with respect to common bar feeders. Moreover, notably in order to accommodate the transmission box 103 inside the body 1 (which, for another type of machine tool, could be constituted by any other mechanical and/or electrical control module), as well as for the passage of various cabling elements, notably along the guide bearings 6, removable countermold elements 51 are provided, for example in POM or any type of plastic of polyester or polyurethane type, intended to form hollow spaces (this is the reason why elements of this type are called "void formers" in English), and which are likewise removed after they have been overmolded. The geometric shape of these removable countermold elements 51 can thus correspond to those that one wishes to integrate in the body, and a compromise can thus be reached between the optimization of the space required for diverse elements to be integrated and the maximization of the mass and the rigidity of the latter, with a view to better damp the noise and the vibrations during use.

Figure 2:
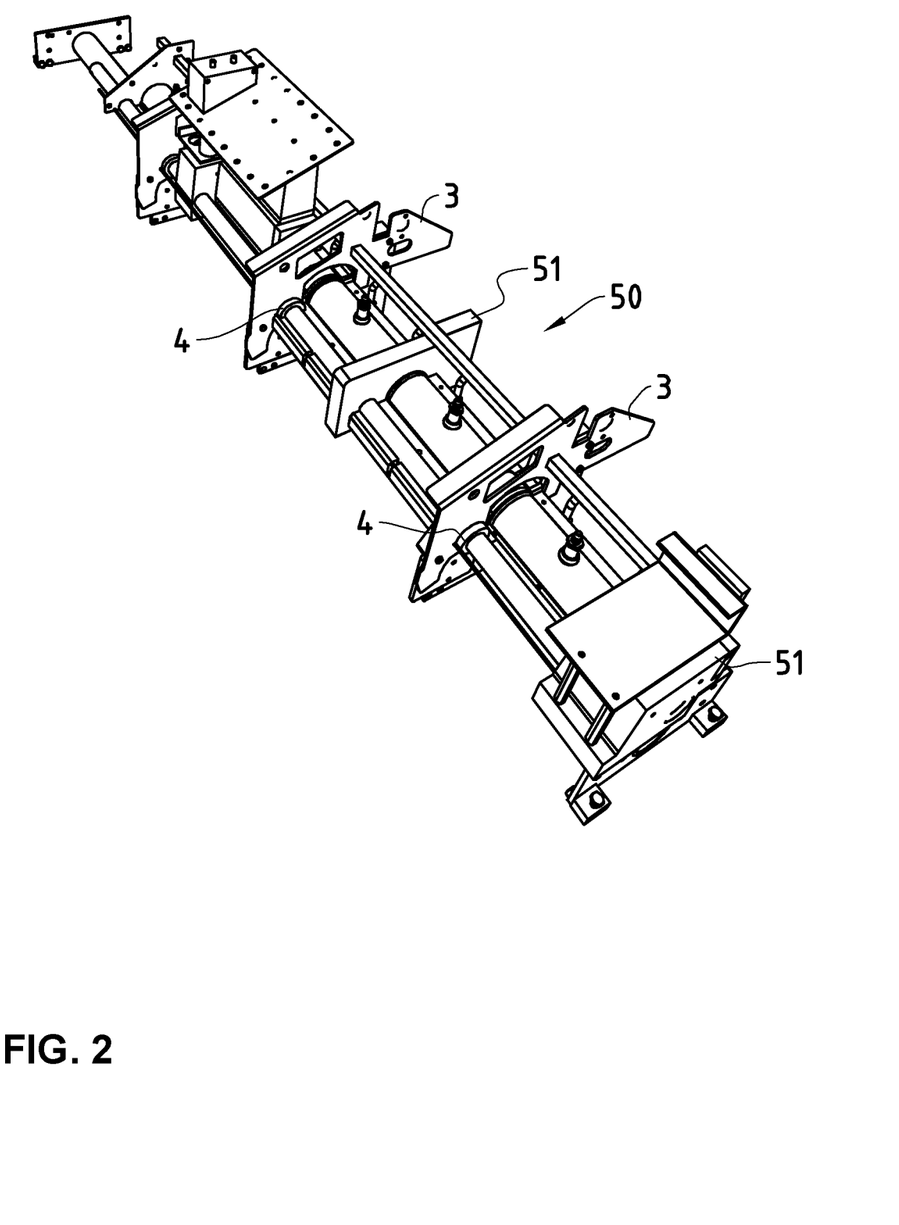
FIG. 2 is a schematic view of a countermold used according to a preferred variant of the invention to produce the body of a bar feeder.

Although not shown explicitly in FIG. 2, it will however be understood that other types of relevant functional elements for a bar feeder could likewise be achieved with the aid of the mold 20 and/or of the countermold 50 as well as removable countermold elements 51 within the scope of the present invention, such as, for example, guide impressions for the tightening material—typically common knives—or even impressions corresponding to the front rest, to the hydraulic recovery lines, to the components of the mechanical transmission of the pusher system, to the extraction system of the slide for the last, non-machinable, tip of bar, electrical and pneumatic cable routing, circuit and hydraulic reservoir, etc. Furthermore, it will be understood that the notions of mold and countermold are used, in the scope of the present invention, by pure convention to associate respectively each of these molds—a countermold constituting in reality only another type of mold—at a molding step A and a corresponding overmolding step B. However, even though a mold is supposed to achieve essentially full or convex forms opposite to a countermold having, for its part, instead as its purpose to form hollow or concave shapes, the molding material being introduced to surround it, it could however be noted that the cavities relative to the central integrated guide channel 2A and to the groove 2B for the closure hinge of the bearing are, according to the preferred embodiment illustrated by FIG. 2, achieved directly by the mold 20, even if these cavities could also be achieved by application of a countermold 50 above the mold 20 holding the molding material, and which will have the desired geometric shapes to form such cavities.

Figures 3A, 3B:
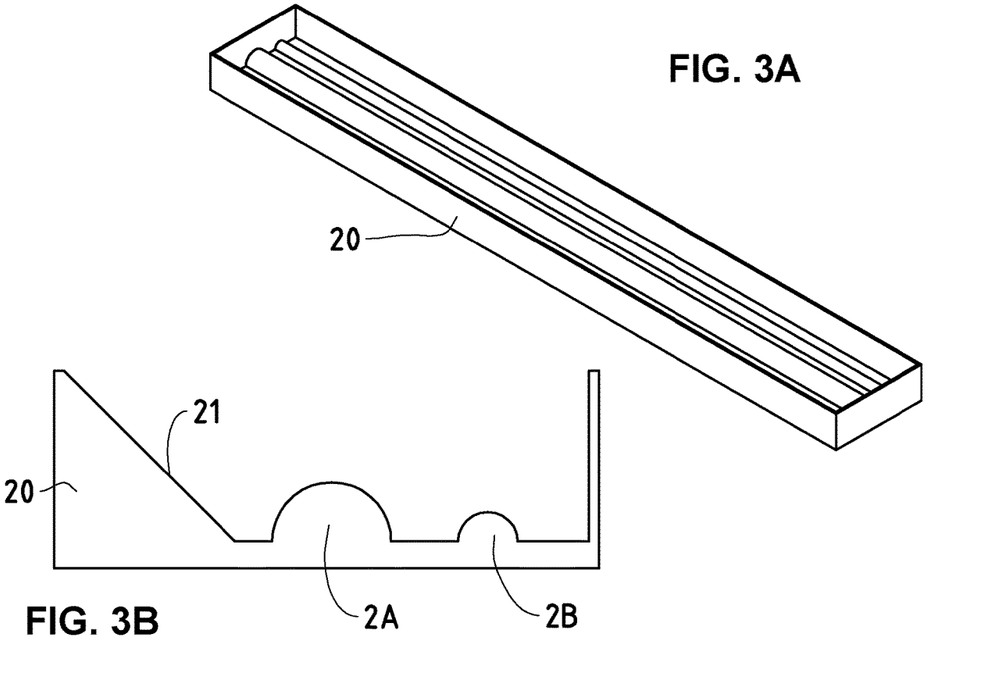
FIGS. 3A and 3B represent respectively a view in three dimensions and a view in section of a mold used according to a preferred embodiment of the invention to produce the body of a bar feeder.

According to the preferred embodiment described with the aid of FIGS. 3A,3B,3C and 3D as well as 4A,4B,4C, 4D,4E,4F,4G,4H, and 4I which follow, several successive operations are carried out to achieve the overmolded body within the framework of the present invention. The production of this body thus begins with the production of an integral central core assembly 2 followed by molding operations illustrated by FIGS. 3A,3B,3C and 3D, which carries out in reality at the same time the operation of overmolding with the aid of the countermold 50, although the latter is not represented in these figures. FIG. 3A thus represents a mold 20, in which one can distinguish in the following FIG. 3B in section different geometric characteristics aiming to confer to the resultant molded object at least certain functional properties. Thus, one can see at the bottom of this mold 20 an inclined lateral wall, aiming to confer to the molded object an inclined rectilinear wall as well as two semicylindrical swellings, juxtaposed one next to the other, in the wall of the bottom of the mold, and aiming to produce two semi-cylindrical grooves of corresponding shape, forming an integrated guide channel 2A as well as a groove 2B to accommodate the closure hinge of the bearing 6 previously described.

Figures 3C, 3D:
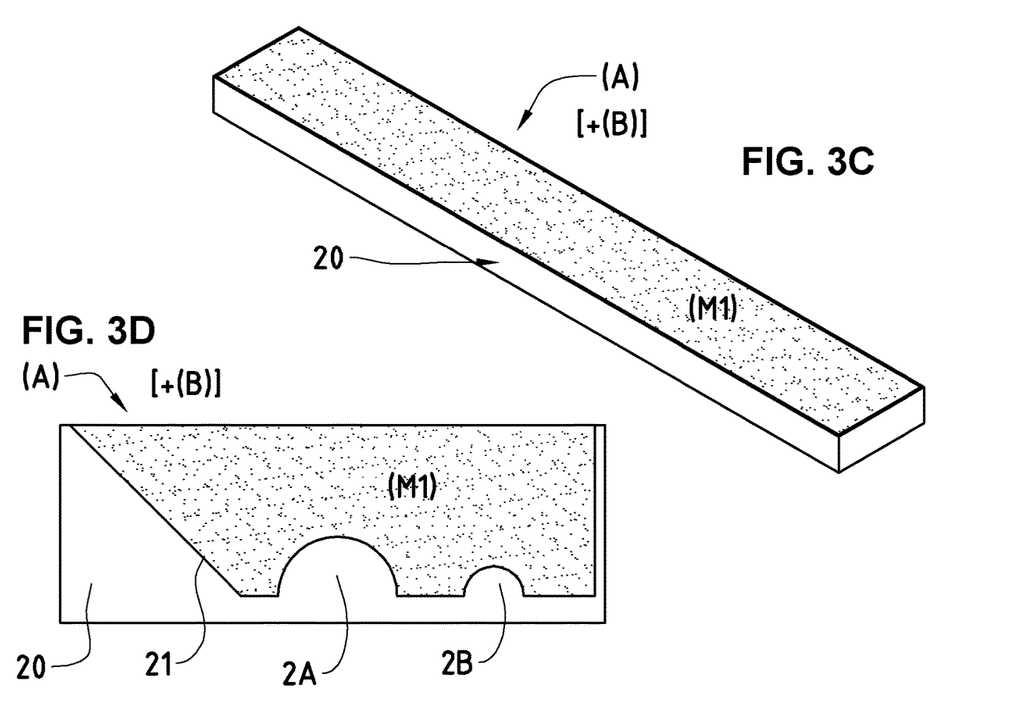
FIGS. 3C and 3D represent respectively a view in three dimensions and a view in section of the mold represented in the preceding FIGS. 3A and 3B, during a first operation of molding of an integral central core assembly for a bar feeder.

During the step of molding A, achieved with the aid of a first molding material M1 consisting preferably of concrete or of polymer resin, one fills the mold 20 to the brim and waits for a flat and horizontal surface to be obtained, as illustrated in FIGS. 3C and 3D. Although not illustrated in this figure, during this molding operation, one preferably adjoins simultaneously the countermold 50, in such a way that the operation of molding A and the operation of overmolding B, each intended to achieve structural and potentially functional elements of the body 1 to be produced, are carried out jointly in order to reduce the maximum production time. However, although it is feasible to achieve directly these two operations respectively of molding A and of overmolding B directly in the box of a body 1 without using a dedicated intermediate mold, using such a mold 20 during an intermediate production operation can be favored in order to separate the function of production of at least certain functional elements, which requires a very precise positioning of the molding and of the countermolding elements to guarantee the alignment of all the guide elements as well as a precise relative positioning of different constituent elements of the body 1 to be produced, from that of intrinsic filling of the box, aiming solely to increase the mass and the rigidity of the body and which consequently requires a lesser precision of positioning of the molding elements and can thus be achieved during a separate subsequent step.

Figure 5:
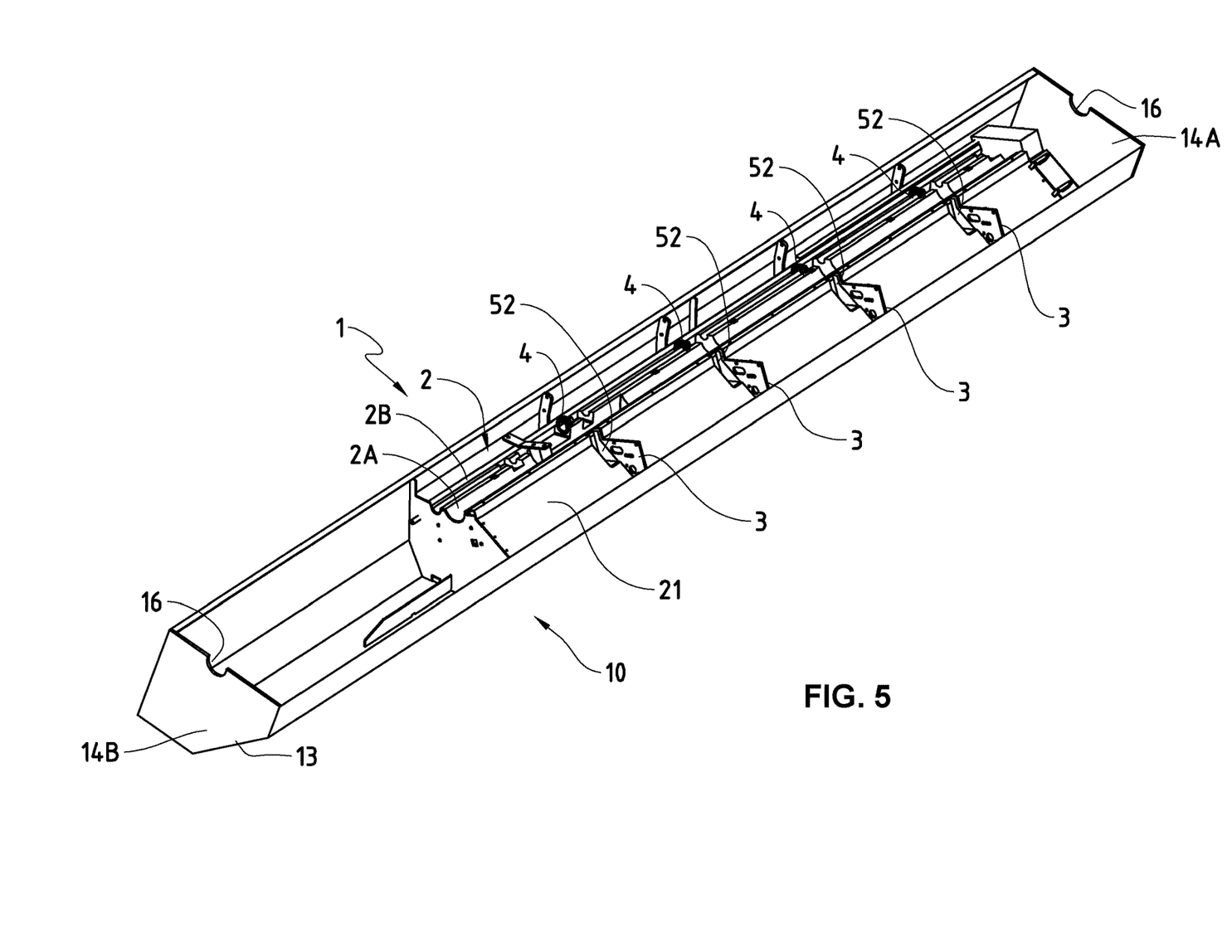
FIG. 5 illustrates a view in three dimensions of an overmolded body for a bar feeder according to a preferred embodiment of the invention, obtained after all the preceding molding operations.

Following the preferably simultaneous first operation of molding A and of overmolding B with the aid of the mold 20 of FIGS. 3A, 3B, 3C and 3D, an integral central core assembly 2 is obtained which can be designated as "pre-functional" because the latter already contains elements resulting from the molding no longer requiring the addition of service parts to be functional—such as, for example, an integrated guide channel 2A as well as the groove 2B to accommodate the opening and closing hinge of the bearings 6—as well as other elements resulting from the operation of overmolding—such as, for example, the anchoring elements 3 and the opening and closing rings 4, visible in FIG. 5, which are, for their part, already finalized and operational after this combined operation of molding and overmolding. This pre-functional integral central core assembly 2 advantageously replaces the two usual frame elements of a bar feeder not only because it makes it possible to merge two structural assembly pieces into one, but also because this obtained piece is, on the one hand, very much more rigid than the pieces in metal used until now, and, on the other hand, it can be achieved very easily at low cost thanks to this technique, and moreover in a reproducible fashion without necessitating systematic fine adjustments during the assembly operations, such that economy of scale is achieved in terms of cost of manpower for production. Finally, this reinforcement piece, which henceforth forms the structural base and the functional frame of the body, permits a modular base to be obtained for different sizes of interchangeable bearings 6, which can be replaced, according to needs, inside of the central integrated guide channel 2A, which has not been possible until now in the aluminum section, the geometric shape of which did not correspond to that of the bearings 6 and did not consequently allow segments of a given size to be accommodated therein.

FIGS. 4A, 4B, 4C, 4D, 4E, 4F, 4G, 4H, and 4I which follow relate to a preferred embodiment using a plurality of successive molding steps, here a first molding step A to achieve the integral central core assembly 2, then a second molding step D achieved in the box 10 of metal of the body 1 itself, in order to fill the interstices left between this integral central core assembly 2 and the inner wall of the box 10. This mode of realization consequently implies separate molding steps, the second molding step being able to be considered in parallel also as an overmolding step, the integral central core assembly 2 playing in effect also a role of countermold during this step. Although in the description which follows, the body formed preserves the box 10 as reinforcement element, one could likewise imagine however, with a concern for additional reduction of costs, using a box 10 only as mold to give the final structural shape to the body 1, structured here around its frame formed by the integral central core assembly 2, but then to reuse it to reproduce other additional bodies, in the same way that one can reuse the mold 20 illustrated by the preceding FIGS. 3A, 3B, 3C and 3D.

According to this preferred embodiment, the box 10 of the body, made preferably of metal or steel, comprises an inclined edge 13, intended to be able to position the box in support during the second molding operation D, as well as a spacer 15 provided with a bearing surface 151 for affixing the integral central core assembly 2 to the interior of the box 10 while leaving a free space with respect to the bottom 11. The lateral walls (first longitudinal lateral wall and second longitudinal lateral walls 12A and 12B) are preferably vertical, while in the front 14A and respectively rear 14B walls of the box 10 notches 16 of semi-circular shape are made, the size of which corresponds to that of the central guide channel 2A of the integral central core assembly formed during the preceding fabrication steps. According to a variant (not illustrated), other geometric shapes (for example elliptical, parabolic, triangular . . . ) can likewise be envisioned insofar as they delimit good guiding features. All the reference signs relating to the box 10 illustrated in FIGS. 4A and 4B being taken over in FIGS. 4C, 4D, 4E, 4F, 4G, 4H, 4I and 4J which follow, these reference numerals or reference signs will not be repeated in every instance for the description of each of these figures, for the sake of conciseness; this remark also applies to the integral central core assembly 2 according to the preferred embodiment described, and of which all the reference numerals are first mentioned in FIGS. 4C and 4D, then subsequently taken over in all the following FIGS. 4E, 4F, 4G, 4H, 4I and 4J.

Figures 4A, 4B:
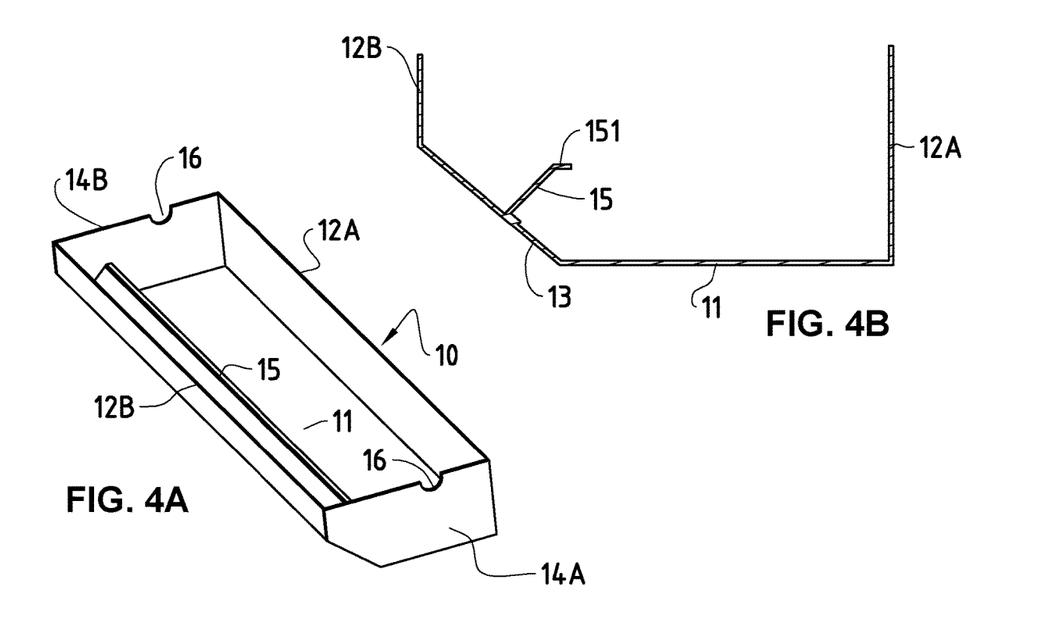
FIGS. 4A and 4B represent respectively a view in three dimensions and a view in section of a bar feeder body box used according to a preferred embodiment of the invention.
Figures 4C, 4D:
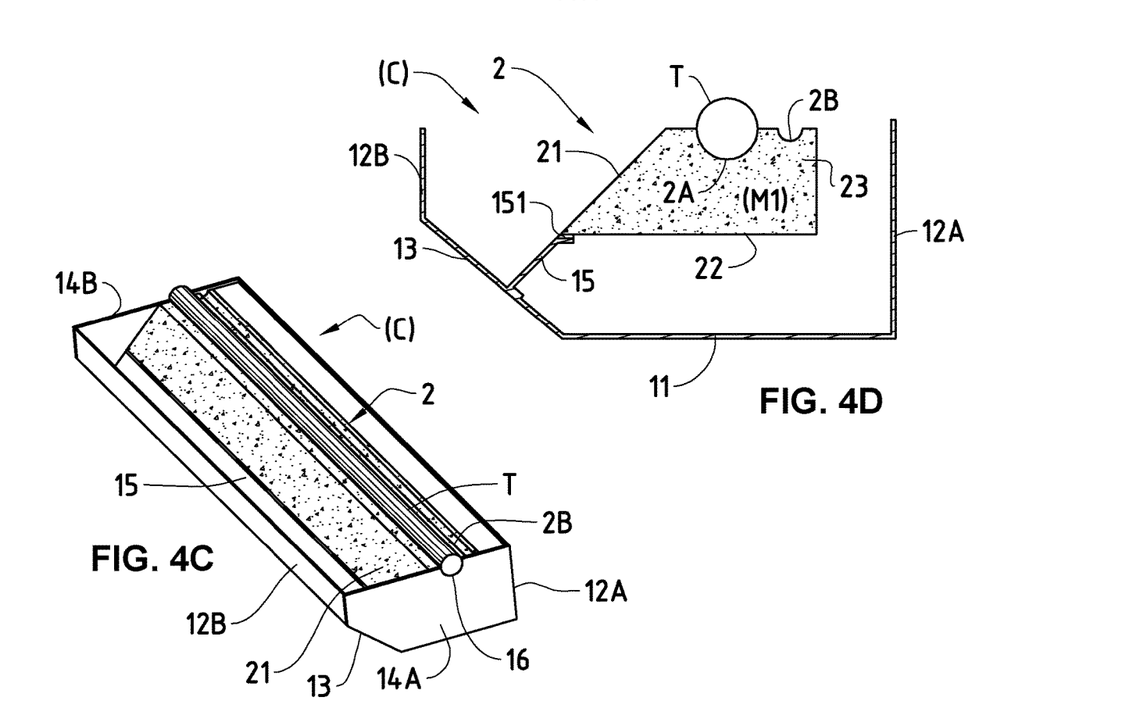
FIGS. 4C and 4D represent respectively a view in three dimensions and a view in section of the bar feeder body box of the preceding FIGS. 4A and 4B, as well as the integral central core assembly obtained following the operation of molding and overmolding according to the invention, during the operation of provisional fixing of the integral central core assembly to the box.

FIGS. 4C and 4D illustrate the step of provisional fixing of the integral central core assembly 2 in the box 10 of the body 1 which one seeks to produce, with a view to achieving the second molding step D intended to increase the mass and the rigidity of the body 1 at the same time that the integral central core assembly 2 is fixed permanently in the box 10.

During this step, the integral central core assembly 2, which comprises an inclined surface 21, as well as a substantially flat lower surface 22 and a substantially vertical lateral surface 23, is positioned, on the one hand, on a substantially horizontal bearing surface 151 at the end of the spacer 15 in the said box 10, while, on the other hand, it is held by a tube T of cylindrical section whose size corresponds to that of the integrated guide channel 2A achieved in the said integral central core assembly 2 having been obtained following the first molding step A jointly with that of the overmolding step B previously carried out. The fixation tube T is affixed on the box 10 by being introduced in the notches 16 of each of the front 14A and rear 14B faces, then it is fixed to these walls with the aid of attachment means (not represented) in order to be held in place during the operation of joining and of molding which will follow. It can be noted that, according to this preferred embodiment, the integral central core assembly 2 is beveled and that the inclination of about 45 degrees likewise corresponds to that of the spacer 15, such that the latter is located in the prolongation of the inclined surface 21 of the integral central core assembly 2 in provisional fixation position. Such a configuration allows, on the one hand, an effective means to be provided for verifying the precision of the intermediate assembly operation before carrying out the second molding operation D, and, on the other hand, makes it possible to ensure there is substantial working space free above the body 1, as well as to accommodate the anchoring pieces 3, relatively large in height, without the latter protruding unduly outside the box 10.

Figures 4E, 4F:
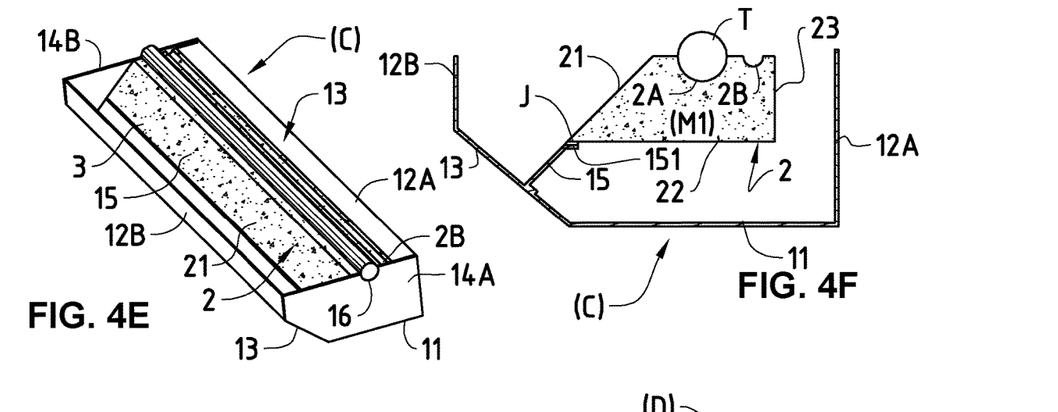
FIGS. 4E and 4F represent respectively a view in three dimensions and a view in section of the bar feeder body box illustrated in the preceding FIGS. 4A and 4B, and the integral central core assembly illustrated in the preceding FIGS. 4C and 4D, during the production of the joint between the integral central core assembly and a bearing surface of a spacer of the box of the frame.

Once the integral central core assembly 2 is positioned following the provisional fixation step C described above on the basis of FIGS. 4C and 4D, a tight joint J is then preferably made at the bearing surface 151, as illustrated in FIGS. 4E and 4F, and this before achieving the second molding step D. The spacer 15, spreading over the entire length of the box 10, will thus make it possible to confine the molding material poured into the interstice between the integral central core assembly 2 and the inner walls of the box 10, the connection not having as a sole purpose that of achieving a fixation by adherence. Preferably, this step is achieved using the same molding material M1 as that used for the achievement of the integral central core assembly 2, i.e. polymer concrete, such that the adherence is maximized with respect to the latter, knowing that the adherence properties of this material are also good with respect to metal.

Figures 4G, 4H, 4I, 4J:
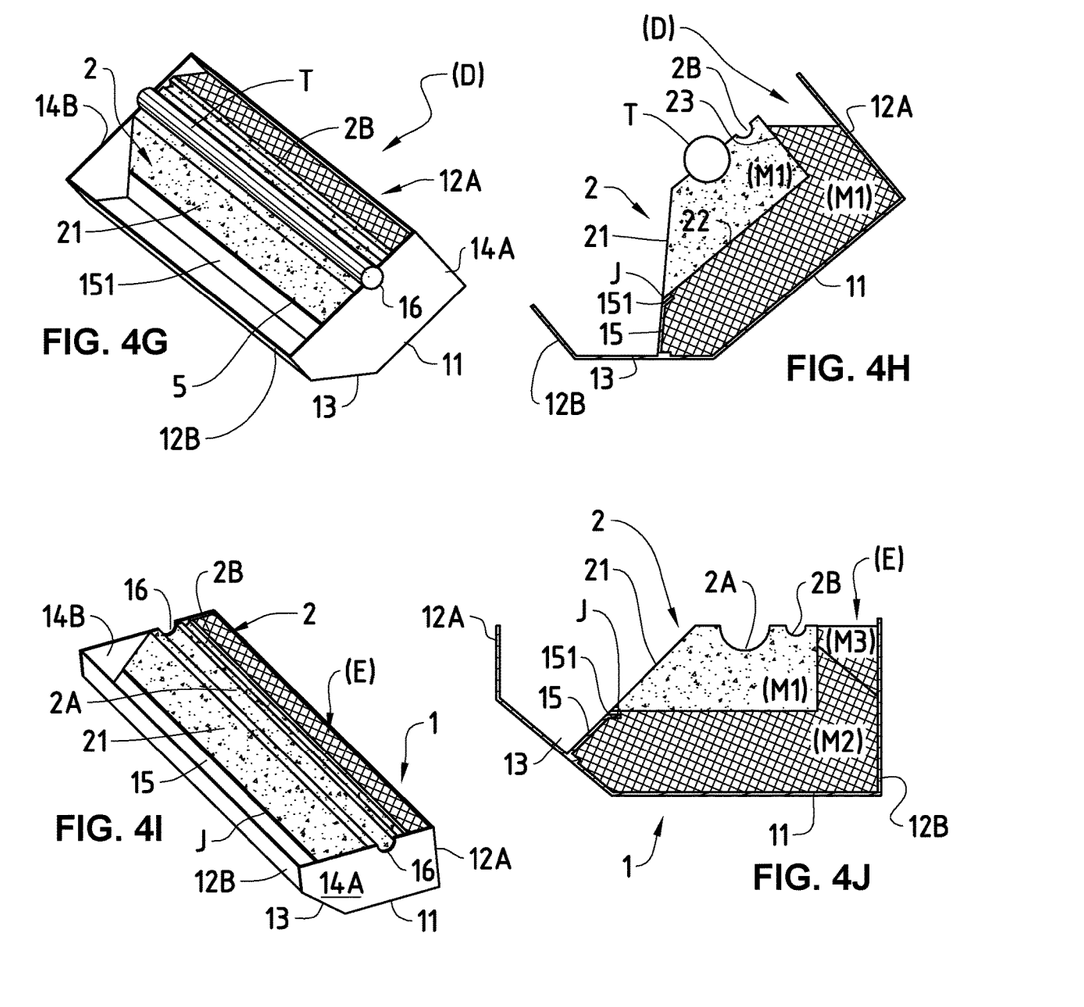
FIGS. 4G and 4H represent respectively a view in three dimensions and a view in section of the bar feeder body box illustrated in the preceding FIGS. 4A and 4B, as well as the integral central core assembly illustrated in the preceding FIGS. 4C and 4D, during a second operation of molding of the integral central core assembly in the box.
FIGS. 4I and 4J represent respectively a view in three dimensions and in section of the bar feeder body box illustrated in the preceding FIGS. 4A and 4B, during a third operation of molding.

Then, once the molding material used to achieve the tight joint J returns again to the level of the ambient temperature, the second molding step D can be achieved, illustrated by the following FIGS. 4G and 4I. During this second molding step D, the box 10 is henceforth positioned leaning on the inclined edge 13 of the box, and a second molding material M2, which can be different from the first molding material M1 and can thus have even better properties of density and rigidity than polymer concrete, is introduced into the space confined between the bottom 11, a lateral wall—here the first lateral wall 12A, a portion of the inclined edge 13 of the box 10, and the spacer 15, on the one hand, and the lower surface 22 and a lateral surface 23 of the integral central core assembly 2, on the other hand, in order to fill the remaining interstice. Preferably, the same molding material will be used as during the first molding operation A, that is to say the first molding material M1 constituted preferably by polymer concrete, of which not only are the properties of rigidity and density advantageous, but also the cost.

Once this second molding step D is achieved and the molding material has returned to the level of the ambient temperature, all the provisional fixation elements can be removed, and, furthermore, according to a preferred embodiment of the production method of the invention, a third molding step E will be carried out to accomplish the bringing up to level of the molding material, as illustrated in FIGS. 4I and 4J, where it can be noted that the box 10 has been repositioned horizontally. Here again, a third molding material M3 can be used, different from the first molding material M1 and from the second molding material M2, for reasons of balancing; however, according to the selected preferred embodiment, the box will preferably be filled until a substantially flat surface is obtained all the while using the same molding material, that is to say polymer concrete (or resin): That the same molding material is always used allows moreover the economy of scale to be maximized again. Furthermore, according to an alternative embodiment, sand and/or gravel could be used at least partially, for example as an additive to the molding material, i.e. any of these choices from among the first molding material M1, the second molding material M2, and the third molding material M3, and this in order to optimize the costs without detriment to the sought task of making the body 1 heavy and rigid.

It can be noted that the elements of the countermold 51 intended to form the additional hollow spaces previously mentioned in connection with FIG. 2, as being additions to the countermold 4 during the said overmolding step B, can also be placed in the box 10, in a supplementary or alternative way, during the second molding step D achieved in the said box 10, and even during the third molding step E, if necessary, in order to free up sufficiently space for different control or cabling elements usually accommodated in the box 10.

After these different molding steps (A,D,E) and the above-mentioned overmolding step B, a body 1 is thus obtained, like that illustrated in FIG. 5, in which the structural properties in terms of rigidity and mass are improved, but for which the costs of manufacture are reduced at the same time. In this figure, inside the box 10 of metal, the integral central core assembly 2 can be distinguished very well, fixed permanently in the box by overmolding—the supplementary molding operations, comprising at least the second molding operation D inside the box 10, being likewise able to be considered as such, with the beam playing in effect likewise a role of countermold at this moment—as well as the inclined wall 21 of the latter and the central guide channel 2A and the groove 2B for the closure hinge of the bearing. In addition to these molded geometric forms, the overmolded metallic elements can be distinguished which are the rings 4 for opening and closing of the bearings, as well as the different anchoring elements positioned at each segment of the routing of the bar feeder, as well as the impressions of the countermold taking shape as the slots 52, the positioning and the dimensions of which are exactly identical for each of the bodies 1 achieved according to the described mode of manufacture. The body 1 being represented in this figure in a direction opposite to that of FIGS. 4A-J, it will be noted however that the front and rear faces 14A and 14B are inverted with respect to these latter figures; however, the fixation notches 16 in the shape corresponding to that of the central guide channel 2A can still be distinguished there. It will be understood from the rest that the shape of the box 10, and in particular the geometric shape of the front and rear faces, respectively 14A and 14B, of the box 10, which precondition the structural form of the casing of the body 1, could be adapted according to needs, and in particular with a view to allowing its manufacture in a single combined molding/overmolding operation.

Thus described has been how to obtain an overmolded body for a bar feeder with the aid of a disruptive production method which makes it possible at the same time to increase the specifications in terms of rigidity and density, to easily integrate all the key elements of the feeder such as, for example, the bearings 6, the front rest 7, and the transmission 8, and to reduce at the same time the costs of manufacture: the specifications are improved while the industrial mode of manufacture is optimized for the bodies thus produced.

It will be understood furthermore from the detailed description which precedes that the advantageous features taken from the preferred embodiments described could be taken in isolation or in combination.

| List of reference numerals | |
|---|---|
| 100 | central beam of metal |
| 101 | aluminum section |
| 102 | mounting flanges for the feet |
| 103 | transmission box |
| 10 | box/metal box |
| 11 | bottom |
| 12A | first longitudinal lateral wall |
| 12B | second longitudinal lateral wall |
| 13 | inclined edge |
| 14A | front wall |
| 14B | rear wall |
| 15 | spacer/inclined tight positioner |
| 151 | bearing surface |
| 16 | notches |
| 1 | body |
| 2 | integral central core assembly |
| 2A | integrated guide channel |
| 2B | groove for the closure hinge of the bearing |
| 20 | mold for the integral central core assembly |
| 21 | oblique lateral surface |
| 22 | lower surface |
| 23 | lateral surface |
| 3 | anchoring elements (inter-segments) |
| 4 | opening and closing ring of the bearings |
| 50 | countermold |
| 51 | removable countermold elements ("void formers") |
| 52 | slots/countermold impressions |
| 6 | bearings |
| 7 | front rest |
| 8 | transmission elements |
| M1 | $1^{st}$ molding material |
| M2 | $2^{nd}$ molding material |
| M3 | $3^{rd}$ molding material |
| T | fixation tube |
| J | joint made before the molding step |
| A | first molding step |

| | List of reference numerals |
|---|---|
| B | overmolding step |
| C | step of provisional fixation of the integral central core assembly to the box |
| D | second molding step |
| E | third molding step |

The invention claimed is:

1. Method of producing a body for a bar feeder, comprising:
 filling a mold with a first molding material, said mold having protrusions for forming impressions in the first molding material,
 removing the first molding material from the mold to form an integral central core assembly,
 fixing said integral central core assembly to a box,
 adding a second molding material to said box, and
 removing said first molding material and said second molding material from said box.

2. The method of producing a body for a bar feeder according to claim 1, wherein removable countermold elements formed to create additional hollow spaces are adjoined to said mold or placed in said box.

3. The method of producing a body for a bar feeder according to claim 1, using polymer concrete as said first molding material.

4. The method of producing a body for a bar feeder according to claim 1, wherein the body includes at least one first structural and/or functional element achieved in an integral way in said first molding material.

5. The method of producing a body for a bar feeder according to claim 4, wherein said first structural and/or functional element of the bar feeder consists of said integral central core assembly.

6. The method of producing a body for a bar feeder according to claim 5, wherein said integral central core assembly comprises an integrated guide channel.

7. The method of producing a body for a bar feeder according to claim 5, wherein anchoring elements are moreover integrated with said integral central core assembly.

8. The method of producing a body for a bar feeder according to claim 4, comprising second structural and/or functional elements, formed by added mechanical pieces which are also overmolded.

9. The method of producing a body for a bar feeder according to claim 4, said body being structured around said box prior to said step of removing said first molding material and said second molding material from said box, the said box comprising an inclined edge, a spacer and notches made in a front wall and a rear wall of said box.

10. The method of producing a body for a bar feeder according to claim 4, wherein said first molding material is made of a polymer resin.

11. The method of claim 1, wherein a countermold is positioned within said box prior to said step of adding a second molding material to said box.

12. The method of producing a body for a bar feeder according to claim 11, further comprising:
 prior to said step of adding said second molding material, fixing mechanical pieces in a removable way to said countermold, said mechanical pieces then being detached from said countermold when the countermold is withdrawn from the body, leaving said mechanical pieces attached to said body.

13. The method of claim 1, wherein said step of adding a second molding material to said box includes at least partially covering said first molding material with said second molding material.

14. The method of claim 1, wherein a spacer attaches said integral core assembly to said box.

* * * * *